United States Patent
Cornelio

(10) Patent No.: US 8,365,406 B2
(45) Date of Patent: *Feb. 5, 2013

(54) BEARING AND SHAFT WHEEL ASSEMBLY BALANCING TECHNIQUES AND EQUIPMENT FOR TURBOCHARGERS

(75) Inventor: Anand Cornelio, Torrance, CA (US)

(73) Assignee: Honeywell International Inc., Morristown, NJ (US)

( * ) Notice: Subject to any disclaimer, the term of this patent is extended or adjusted under 35 U.S.C. 154(b) by 1105 days.

This patent is subject to a terminal disclaimer.

(21) Appl. No.: 11/946,212

(22) Filed: Nov. 28, 2007

(65) Prior Publication Data

US 2009/0136334 A1 May 28, 2009

(51) Int. Cl.
*B21K 25/00* (2006.01)
*B23P 11/00* (2006.01)
*G01M 1/00* (2006.01)

(52) U.S. Cl. ............... 29/889.2; 29/434; 73/455; 73/476

(58) Field of Classification Search .............. 29/889.2, 29/434; 73/455, 476, 66, 471, 462; 415/104, 415/107; 417/407

See application file for complete search history.

(56) References Cited

U.S. PATENT DOCUMENTS

| | | | |
|---|---|---|---|
| 4,170,528 A * | 10/1979 | Mathews | ............ 205/644 |
| 4,268,229 A | 5/1981 | Berg | |
| 4,279,576 A | 7/1981 | Okano et al. | |
| 4,429,838 A * | 2/1984 | Lenk et al. | .............. 242/573.7 |
| 4,467,649 A * | 8/1984 | Mueller | ...................... 73/462 |
| 4,635,481 A * | 1/1987 | Curchod | ..................... 73/460 |
| 4,694,689 A * | 9/1987 | Kawasaki | ................ 73/114.77 |
| 4,716,761 A * | 1/1988 | Ito et al. | .................. 73/114.77 |
| 4,976,147 A * | 12/1990 | Okochi et al. | ................. 73/455 |
| 5,370,378 A * | 12/1994 | Weber et al. | ................ 269/309 |
| 5,890,881 A | 4/1999 | Adeff | |
| 6,050,095 A | 4/2000 | Blake | |
| 6,145,313 A | 11/2000 | Arnold | |
| 6,449,950 B1 | 9/2002 | Allen et al. | |
| 7,086,842 B2 | 8/2006 | Wild | |
| 2004/0207141 A1* | 10/2004 | Kuroda | ....................... 269/309 |
| 2007/0229954 A1* | 10/2007 | Bral | ............................ 359/509 |
| 2009/0136368 A1 | 5/2009 | Arnold et al. | |
| 2009/0183556 A1* | 7/2009 | Shimizu et al. | .................. 73/66 |

FOREIGN PATENT DOCUMENTS

WO 2006005355 A1 1/2006

* cited by examiner

*Primary Examiner* — Alexander P Taousakis
(74) *Attorney, Agent, or Firm* — Brian J. Pangrle

(57) ABSTRACT

An exemplary clamp for clamping a bearing cartridge and shaft subassembly of a turbocharger includes an upper portion, a lower portion where the upper portion and the lower portion form a bore having a bore diameter sized to clamp a bearing cartridge and a fluid passage defined in part by the upper portion, the lower portion or the upper portion and the lower portion where the fluid passage includes an opening to the bore. Various other exemplary devices, systems, methods, etc., are also disclosed.

12 Claims, 7 Drawing Sheets

BEARING AND SHAFT WHEEL ASSEMBLY BALANCING TECHNIQUES AND EQUIPMENT FOR TURBOCHARGERS

TECHNICAL FIELD

Subject matter disclosed herein relates generally to turbomachinery for internal combustion engines and, in particular, to techniques and equipment for balancing turbomachinery components.

BACKGROUND

During turbocharger manufacture, balancing typically occurs for one or more individual components, one or more component assemblies or a combination of both. For example, consider a center housing rotating assembly (CHRA) that includes a turbine wheel and a compressor wheel attached to a shaft rotatably supported in a center housing by a bearing. In this example, component balancing of the turbine wheel and the compressor wheel may occur followed by assembly of the CHRA and assembly balancing of the CHRA.

With respect to assembly balancing of a CHRA, techniques exist for low-speed balancing and for high-speed balancing where the choice of technique typically depends on a turbocharger's bearing characteristics. For example, non-preloaded and centrifugally pre-loaded angular contact ball bearing cartridges typically experience "walking" at low rotational speeds, which can confound low-speed balancing (e.g., by causing unpredictable variations in measurements); thus, for such bearing cartridges, CHRA balancing normally occurs at high rotational speeds.

A need exists for technology that facilitates balancing of turbochargers. In particular, a need exists for technology that allows for low-speed balancing of non-preloaded and centrifugally pre-loaded angular contact ball bearing cartridges. Various exemplary devices, methods, systems, etc., disclosed herein aim to meet these needs and/or other needs.

BRIEF DESCRIPTION OF THE DRAWINGS

A more complete understanding of the various methods, devices, systems, arrangements, etc., described herein, and equivalents thereof, may be had by reference to the following detailed description when taken in conjunction with the accompanying drawings where.

DETAILED DESCRIPTION

Various exemplary methods, devices, systems, arrangements, etc., disclosed herein address issues related to technology associated with turbochargers.

Figure 1:
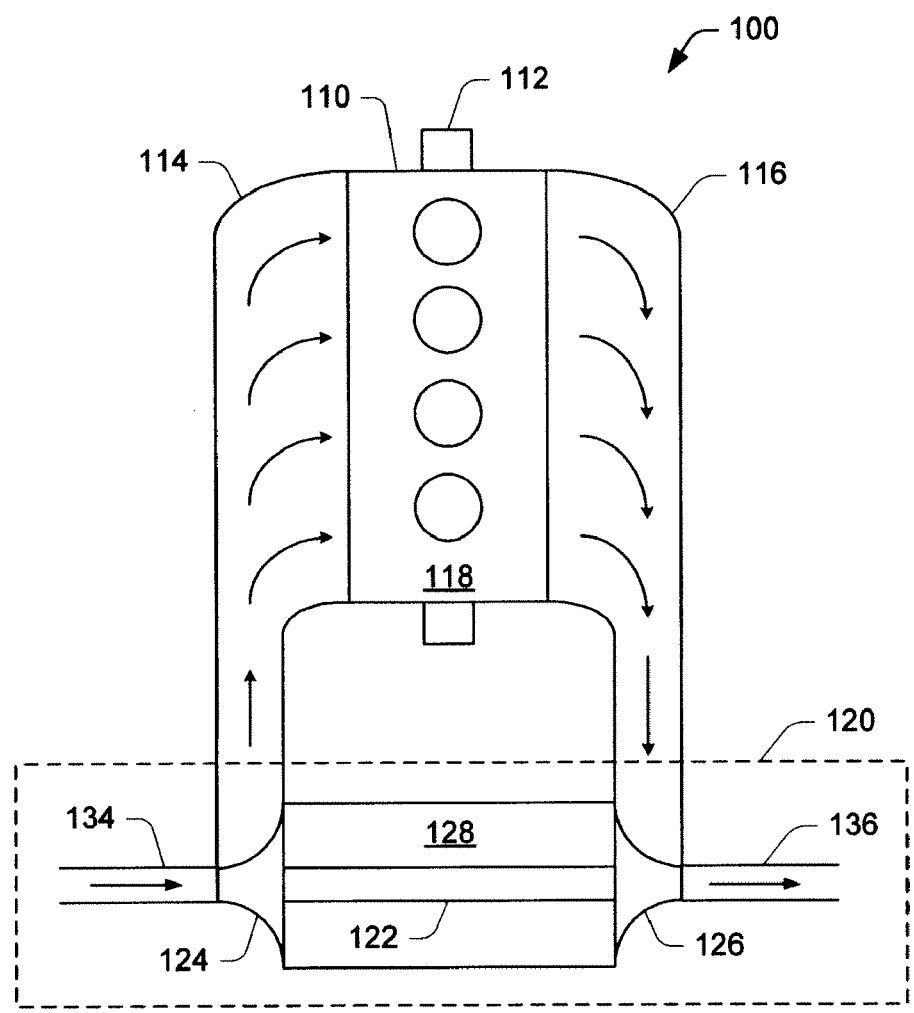
FIG. 1 is a diagram of a conventional turbocharger and internal combustion engine.

Turbochargers are frequently utilized to increase the output of an internal combustion engine. Referring to FIG. 1, a prior art system 100, including an internal combustion engine 110 and a turbocharger 120 is shown. The internal combustion engine 110 includes an engine block 118 housing one or more combustion chambers that operatively drive a shaft 112. As shown in FIG. 1, an intake port 114 provides a flow path for air to the engine block 118 while an exhaust port 116 provides a flow path for exhaust from the engine block 118.

The turbocharger 120 acts to extract energy from the exhaust and to provide energy to intake air, which may be combined with fuel to form combustion gas. As shown in FIG. 1, the turbocharger 120 includes an air inlet 134, a shaft 122, a compressor 124, a turbine 126, a housing 128 and an exhaust outlet 136. The housing 128 may be referred to as a center housing as it is disposed between the compressor 124 and the turbine 126. The shaft 122 may be a shaft assembly that includes a variety of components.

Referring to the turbine 126, such a turbine optionally includes a variable geometry unit and a variable geometry controller. The variable geometry unit and variable geometry controller optionally include features such as those associated with commercially available variable geometry turbochargers (VGTs). Commercially available VGTs include, for example, the GARRETT® VNT™ and AVNT™ turbochargers, which use multiple adjustable vanes to control the flow of exhaust across a turbine. An exemplary turbocharger may employ wastegate technology as an alternative or in addition to variable geometry technology.

Figure 2:
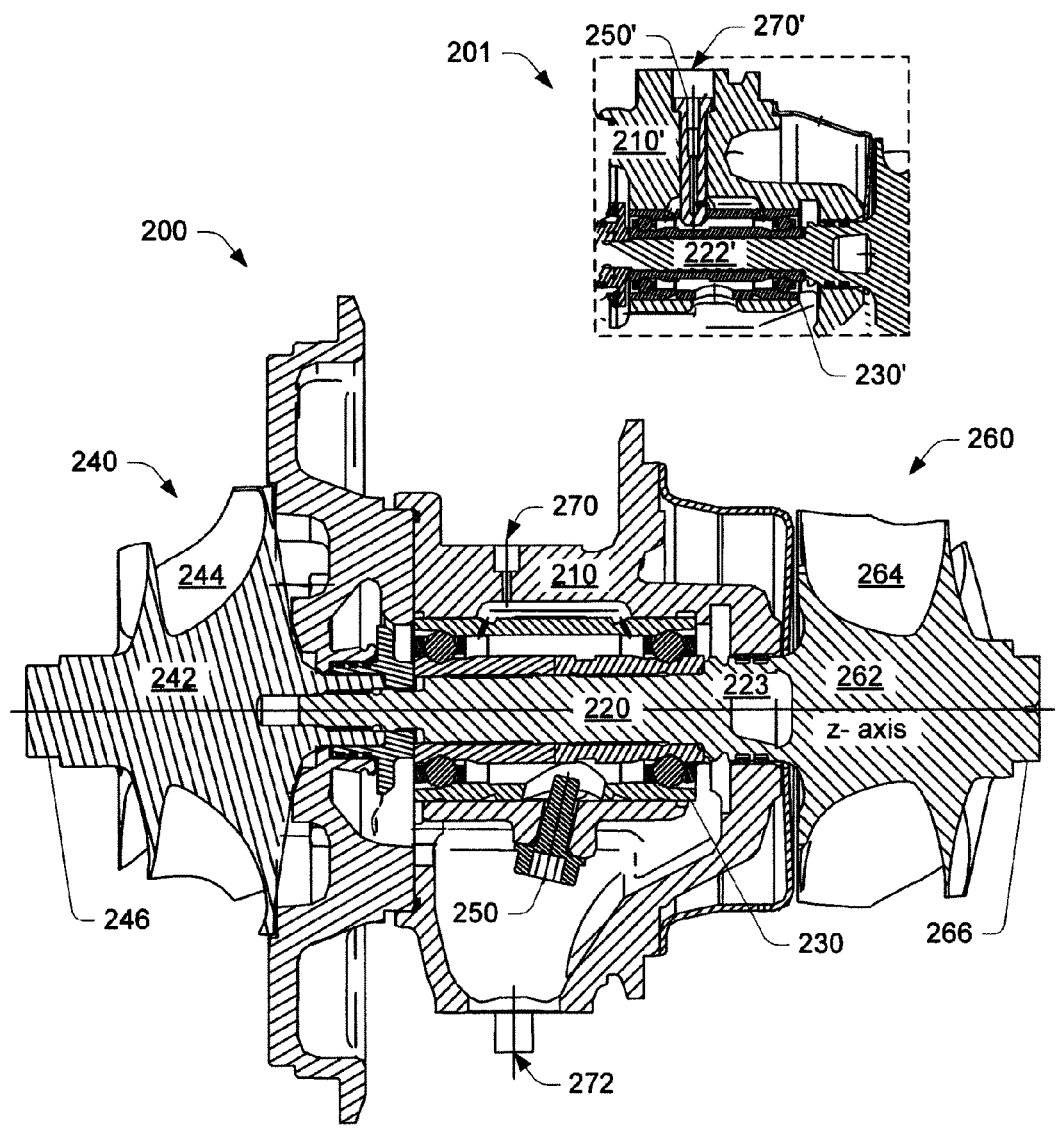
FIG. 2 is a cross-sectional view of a prior art turbocharger that includes a bearing cartridge with an anti-rotation mechanism and a cross-sectional view of an alternative anti-rotation mechanism.

FIG. 2 shows a cross-section of a prior art turbocharger 200 suitable for use as the turbocharger 120 of FIG. 1. The turbocharger 200 serves as a non-limiting example to describe various exemplary devices, methods, systems, etc., disclosed herein. The turbocharger 200 includes a center housing 210, a shaft 220, a compressor wheel 240 and a turbine wheel 260 where the compressor wheel 240 and the turbine wheel 260 are operably connected to the shaft 220. The compressor wheel 240, the turbine wheel 260 and the shaft 220 have an axis of rotation substantially coincident with the z-axis. The center housing 210 supports a bearing cartridge 230 that receives the shaft 220 and allows for rotation of the shaft 220 about the z-axis.

The compressor wheel 240 includes a hub 242 and a plurality of blades 244. The hub 242 terminates at a nose end 246, which may be shaped to facilitate attachment of the wheel 240 to the shaft 220. For example, the nose end 246 may include features to accept a socket or a wrench (e.g., consider a hexagonal shape). The turbine wheel 260 includes a hub 262 and a plurality of blades 264. The hub 262 terminates at a nose end 266, which may be shaped to facilitate attachment of the wheel 260 to the shaft 220. For example, the nose end 266 may have features to accept a socket or a wrench (e.g., consider a hexagonal shape).

The shaft 220 includes a compressor shaft portion that extends into a bore of the compressor wheel hub 242. While the example of FIG. 2 shows a "boreless" compressor wheel (i.e., no through bore), other types of compressor wheels may be used. For example, a compressor wheel with a through bore or full bore typically receives a shaft that accepts a nut or other attachment mechanism at the nose end 246 of the hub 242. Such an attachment mechanism may include features to accept a socket or a wrench (e.g., consider a hexagonal shape).

The center housing 210 includes a bore for receipt of the bearing cartridge 230, a lubricant inlet 270 and a lubricant outlet 272 that allow lubricant flow to the bearing cartridge 230. In the arrangement of FIG. 2, a lubricant film exists between portions of the bore and portions of the bearing cartridge 230, which allow the bearing cartridge 230 to "float" in the bore. An anti-rotation mechanism relies on a pin or bolt 250 received by and extending through an opening of the housing 210. The mechanism further relies on an opening in the bearing cartridge 230 that receives the bolt 250. As shown in FIG. 2, the anti-rotation mechanism allows for some small amount of rotation of the bearing cartridge 230 about the z-axis in a manner that does not hinder flotation of the bearing cartridge 230 by the lubricant film.

The alternative arrangement 201 relies on a pin or bolt 250' that allows for lubricant flow from an lubricant inlet 270' to the bearing cartridge 222' (e.g., via a channel or path through and/or around a pin or bolt) and that limits rotation of the bearing cartridge 222' about the z-axis in a manner that does not hinder flotation of the bearing cartridge 222' in the housing 210'. The pin or bolt 250' may allow for some small amount of rotation of the bearing cartridge 230' in the housing 210'.

Figure 3:
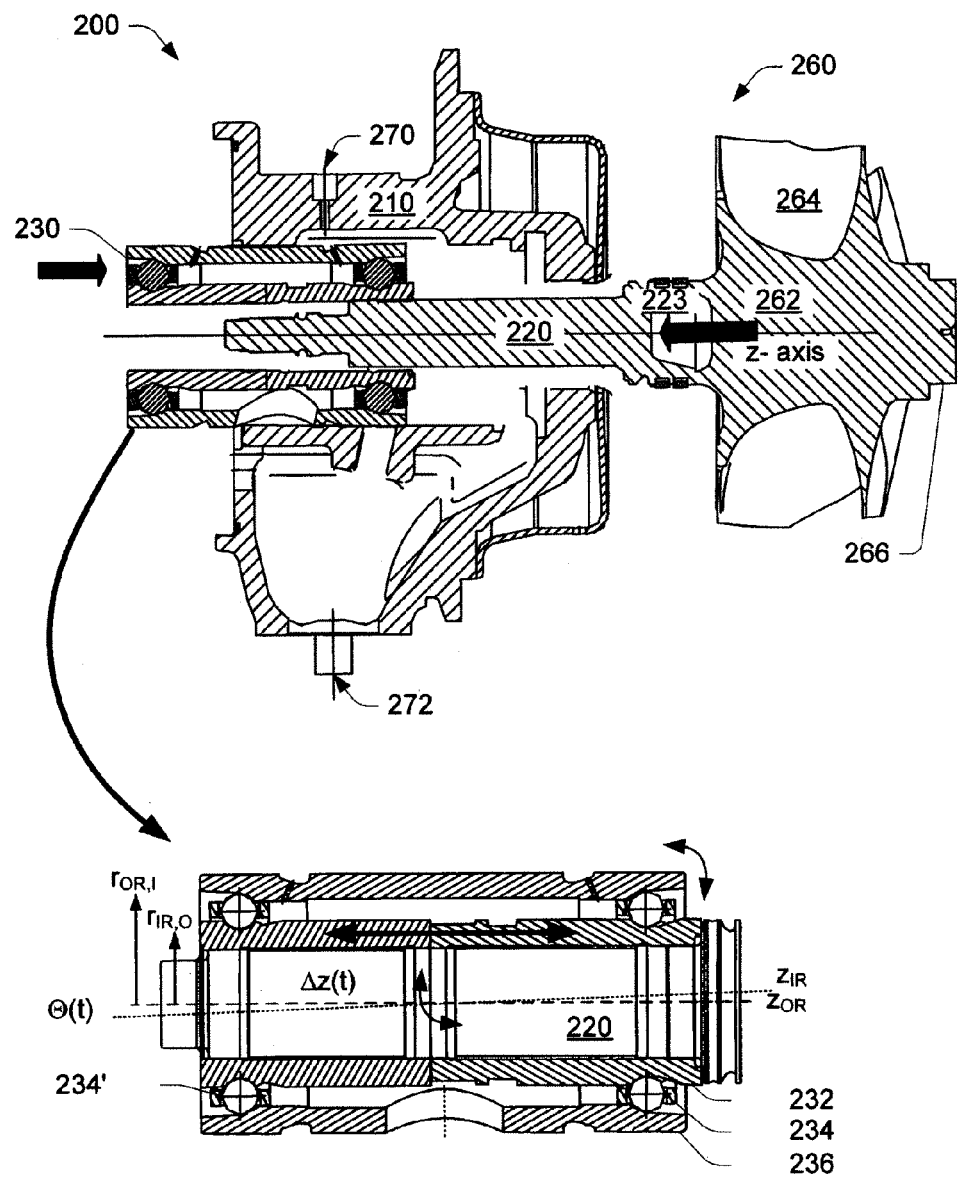
FIG. 3 is an exploded cross-sectional view of the prior art turbocharger of FIG. 2 that illustrates assembly of the bearing cartridge and shaft into the center housing and a cross-sectional view of a bearing cartridge to illustrate undesirable movements.

FIG. 3 shows the prior art assembly 200 of FIG. 2 and a more detailed view of the ball bearing cartridge 230. In the assembly 200, the bearing cartridge must be inserted from the compressor end of the housing 210 while the shaft 220 must be inserted from the turbine end of the housing 210. Consequently, the bearing cartridge 230 and the shaft 220 cannot be assembled and balanced and then inserted together as a unit into the housing 210. In other words, while the cartridge 230 and the shaft 220 can be assembled and balanced, the components must be separated prior to insertion of the bearing cartridge 230 and the shaft into the housing 210.

A conventional balancing method commences in a positioning step that includes positioning an assembly on a balancing unit. With respect to commercially available balancing units for turbocharger assemblies, the company Schenck RoTec GmbH (Darmstadt, Germany) markets various balancing machines for turbocharger core assemblies (e.g., horizontal balancing machines such as MBRS series). Such balancing machines operate at low-speed for acquiring dynamic unbalance measurements of a turbocharger core assembly, for example, prior to high-speed balancing of a core assembly. Such machines typically include one or more transducers for acquisition or sensing of information (e.g., movement, velocity, force, etc.) for use in balancing.

According to this conventional method, an activation step activates an air drive that directs compressed air toward a turbine wheel or a compressor wheel to cause rotation of the rotating components. A measurement step commences once the rotating components achieve a desired speed. In general, rotational speed for low-speed balancing does not exceed about 5,000 rpm.

An action step can take any of a variety of actions following the measurement step. For example, the measurement step may generate information as to dynamic unbalance, such as, mass and angle information for removal or addition of mass from an assembly. The aforementioned commercially available balancing machines include circuitry (and/or software) that can measure dynamic unbalance in two planes and can convert unbalance measurement values to correction information for one or more correction planes. Correction information may indicate, for example, removal of 1 gram of mass at an angle of 20° to achieve an acceptable level of dynamic unbalance, noting that some level of dynamic unbalance will always exist. Thus, where the level of dynamic unbalance falls below a predetermined limit, then the measurement step 306 may indicate that the assembly is "OK". Where the level of dynamic unbalance exceeds a predetermined upper limit, then the measurement step may indicate that the assembly is not OK, i.e., "NOK". While removal and/or addition of mass may be corrective actions, such an indication may require disassembly of the core, replacement of one or more components followed by reassembly and balancing of the core.

A balancing machine may include circuitry and/or software that provides for measurement assessment, correction calculation and control, fault diagnostics, statistical process control, and data transfer. A machine may allow for selection of type or types of correction to take after a measurement (e.g., polar or in components, in metric or imperial units, as digital values, vector displays or color graphics). A machine may provide for correction information automatically whether corrections occur through drilling, milling, welding, grinding, classification, in components or polar, in one or more planes, in multiple processing steps, in fixed or iterative systems. Through use of sensors, a machine may provide for measurement and optionally feedback for positioning a workpiece and/or a tool.

For balancing assemblies that include non-preloaded or centrifugally pre-loaded angular contact ball bearing cartridges, conventional methods prove problematic. As already mentioned, bearing cartridges can experience walking at low rotational speeds, which can cause unpredictable variations in measurements.

As shown in FIGS. 2 and 3, the bearing cartridge 230 includes an inner race 232, two sets of bearings 234, 234' and an outer race 236. An internal radial clearance exists $\Delta r_{internal}$ between each set of bearings 234, 234' and the outer surface of the inner race 232 (e.g., at $r_{IR,O}$) and the inner surface of the outer race 236 (e.g., at $r_{OR,I}$). These clearances allow the inner race 232 to move slightly off axis and to tilt with respect to the outer race 236. In FIG. 3 the dashed axial line representing the axis of the outer race 236 ($z_{OR}$), the dotted axial line representing the rotational axis of the inner race 232 ($z_{IR}$) and the angle $\Theta_{internal}$ formed between these two axes, which may vary over time. Further, the inner race 232 may translate with respect to the outer race 236, as indicated by a thick double headed arrow and the axial distance $\Delta z_{internal}$, which may vary over time (e.g., as measured by a difference between an axial mid-point of the outer race 236 and an axial mid-point of the inner race 232). As the radius of the inner surface of the outer race 236 ($r_{OR,I}$) increases toward the ends of the bearing cartridge 230, translation of the inner race 232 with respect to the outer race 236 can alter internal clearances ($\Delta r_{internal}$), as can changes in tilt angle ($\Theta_{internal}$).

Yet further, the outer race 236 may move in the bore of the center housing 210 as it floats on a lubricant film. Such movement may include off axis displacement and/or tilt where the tilt forms an angle $\Theta_{damper}$ between the axis of the outer race 236 ($z_{OR}$) and the axis of the bore of the center housing 210 ($z_B$). Consider parameters such as $\Theta_{damper}$, $\Delta z_{damper}$, $\Delta r_{damper}$, which may vary with respect to time (e.g., where $\Delta z_{damper}$ may be a difference between an axial mid-point of the outer race 236 and an axial mid-point of a housing bore and where $\Delta r_{damper}$ may be a difference between an outer diameter of the outer race 236 and an inner diameter of a housing bore). Air drive of a CHRA, per a conventional method, usually results in movement of the inner race 232 with respect to the outer race 236 and/or the outer race 236 with respect to the bore of the center housing 210. Thus, when a bearing cartridge is positioned in a housing, multiple angles (e.g., $\Theta_{damper}$, $\Theta_{internal}$), clearances ($\Delta r_{damper}$, $\Delta r_{internal}$) and axial displacements ($\Delta z_{damper}$, $\Delta z_{internal}$) may exist, which can confound balancing.

As described herein, an exemplary method loads a bearing cartridge to reduce or eliminate undesirable movement of an inner race with respect to an outer race and/or undesirable movement of an outer race with respect to the bore of a center housing.

An exemplary method can commence in a positioning step that includes positioning an assembly on a balancing unit. The balancing unit may include various features of aforementioned commercially available balancing units for turbocharger assemblies, however, as described herein, the positioning step includes loading the bearing cartridge 230. For example, a belt may be used to rotate the shaft where the belt applies a force to the shaft (e.g., a downwardly directed force aligned with gravity).

According to an exemplary method, the applied force causes the inner race 232 to tilt at a small angle (e.g., Y<about 5°) with respect to the axis of the outer race 236. This predictable amount of tilt causes a reduction in the internal clearance ($\Delta r_{internal}$) at the upper portion of the turbine side of the bearing cartridge 230 and at the lower portion of the compressor side of the bearing cartridge 230 (or vice versa). In particular, the tilt causes the inner race 232 to contact the outer race 236 via the bearing 234 and the bearing 234'. The applied force typically aims to maintain a certain amount of tilt, which, in turn, can reduce undesirable movement of the inner race 232 with respect to the outer race 236. For example, the applied force can reduce translation of the inner race 232 with respect to the outer race 236 and/or time varying tilt of the inner race 232 with respect to the outer race 236. Thus, such an approach applies a force to impart a substantially constant $\Theta_{internal}$ (and/or $\Theta_{damper}$) and $\Delta r_{internal}$ (e.g., two values for each bearing set, approximately 0 mm and some other value for an opposing side), which, in turn, can also reduce magnitude of $\Delta z_{internal}$ (and/or $\Delta z_{damper}$) and axial movement with respect to time.

The aforementioned exemplary method then proceeds in an activation step that activates a drive to rotate the rotating components. The drive may apply the load or a load may be applied separately. In either instance, the method introduces a tilt that causes the assembly to maintain a more stable configuration during balancing when compared to conventional methods. A measurement step commences once the rotating components achieve a desired speed. The balancing method may include use of a conventional measuring technique, for example, as described above. Further, an action step may include any of the actions described above with respect to the conventional method.

An exemplary method for balancing a rotating assembly of a turbocharger includes loading the rotating assembly to introduce a tilt between the rotational axis of an inner race of the bearing cartridge and a bore axis of an outer race of the bearing cartridge, rotating the inner race with respect to the outer race at a rotational speed less than approximately 5,000 rpm while maintaining the tilt at substantially constant angle and measuring dynamic unbalance of the rotating assembly. After such measuring, one or more actions may be taken and the process repeated, as appropriate or desired.

As described herein, a rotating assembly may cooperate with a clamp to clamp the bearing cartridge of the rotating assembly. Such a clamp may allow for a damper clearance or it may fix the outer race of the bearing cartridge. A clamp may include an anti-rotation mechanism to limit rotation of an outer race of a bearing cartridge. Such a mechanism may allow for some minimal rotation or may fix the bearing cartridge in a manner that essentially prevents rotation of the outer race.

As described herein, an exemplary method includes loading to introduce a tilt angle between the bore axis of an outer race of a bearing cartridge and a bearing cartridge bore axis of a clamp. Such loading typically creates an asymmetry in the lubricant film. For example, such loading may cause the outer race to contact the bore of the center housing at one or more points. Where the load is maintained during balancing, movement of the outer race with respect to the bore of the clamp is reduced.

As already explained, a bearing cartridge may include one or more sets of bearings. For example, the cartridge 230 includes a first set of bearings 234 disposed radially between the inner race 232 and the outer race 236 and a second set of bearings 234' disposed radially between the inner race 232 and the outer race 236. Loading can cause the inner race 232 to contact the outer race 236 via the first set of bearings 234 and via the second set of bearings 234'.

As described in more detail below, a method may include positioning a belt on a portion of a rotating assembly where the belt provides for loading and/or rotating. The portion of the rotating assembly may have a polygonal or other shaped cross-section substantially centered on the rotational axis of the inner race of the bearing cartridge.

Figure 4:
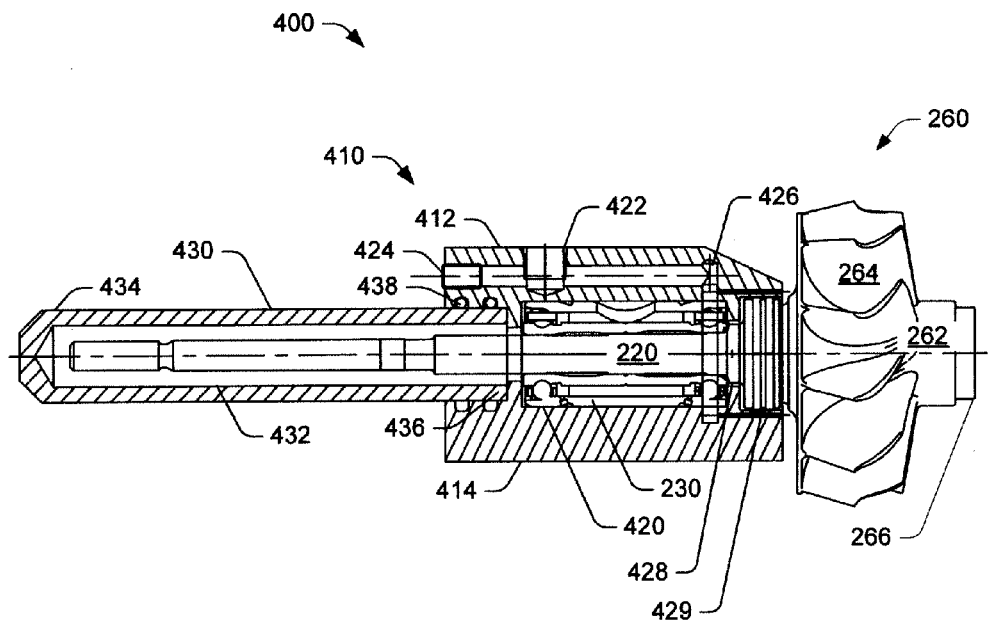
FIG. 4 is a cross-sectional view of an exemplary clamp for balancing a bearing cartridge and shaft wheel subassembly of a turbocharger.

FIG. 4 shows a cross-section view of an exemplary balancing assembly 400. The balancing assembly 400 includes a clamp 410 having a bore 420 to receive a bearing cartridge 230 and shaft 220 subassembly. In the example of FIG. 4, the shaft 220 is a turbine shaft connected to a turbine wheel 260. The clamp 410 includes a clamshell with an upper portion 412 and a lower portion 414 as well as a tubular extension 430 having a bore 432 that receives part of the shaft 220, which part, upon assembly into a turbocharger, generally receives a compressor wheel.

The clamp 410 includes one or more fluid openings 422, 424, which may be used for fluid to lubricate and/or cool various components of the assembly 400 during operation. For example, the fluid may be air or another fluid to cool the bearing cartridge 230 and to maintain a positive pressure within the bore 420 of the clamp 410, which can, for example, prevent contaminants from entering the bore 420 and damaging the bearing cartridge 230. In another example, the fluid is a lubricant such as oil to reduce friction and create a hydrodynamic environment as would be expected during operation of a turbocharger.

In the example of FIG. 4, the fluid openings 422, 424 are in fluid communication with a bore-side fluid opening 426. Thus, fluid may be introduced into the bore 420 via one or both of the openings 422, 424. In turn, the fluid can cool and/or lubricate the bearing cartridge 230.

Fluid may flow in the clamp 410 to fill the bore 432 of the extension. Fluid may also flow toward the turbine 260 via a smaller diameter bore 428 adjacent the bore 420. The smaller diameter bore 428 may be adjacent a larger diameter bore 429 configured to receive a portion of the turbine 260. In the example of FIG. 4, the turbine 260 includes a grooved portion configured to receive one or more seal rings. One or more seal rings may be used to help seal fluid in the clamp 410.

As described herein a balancing process includes placing a bearing and shaft assembly in a clamp such as the clamp 410 of FIG. 4. In this process, the clamp can hold a "shaft wheel assembly" (SWA) and a ball bearing cartridge (BB) in a manner that allows a belt drive to rotate the shaft. As shown in FIG. 4, the clamp 410 can hold the outer race of the ball bearing cartridge 230 with nearly zero clearance (e.g., within some reasonable machining limits).

In the instance that seal rings (e.g., piston rings) are assembled on the SWA prior to SWA/BB balance, then the clamp 410 can include appropriate seal bore diameters to isolate the seal rings and prevent rotational movement. The clamp 410, via introduction of a fluid, can prevent grinding contamination from infiltrating the ball bearing cartridge.

In the assembly 400, a belt drive can drive the SWA. For example, a belt (e.g., cotton) can be placed over the contour of the turbine 260 or other suitable location, such as the nose 266. A belt can be tensioned by a set of pulleys and a weight to ensure application of a consistent force to the SWA.

According to an exemplary process, once the SWA/BB is loaded and bolted into the clamp 410 and the belt is placed over the SWA, the drive motor is actuated to drive the SWA to a predetermined measurement speed. As mentioned, with appropriate instrumentation, a two plane measurement can be made and recorded. Corrections to unbalance can be performed if the unbalance level in either of the two planes is unacceptable.

Trials using this process, demonstrated SWA/BB initial unbalance to be typically on the order of 3 to 6 times the SWA balance, thereby indicating increased unbalance due to BB or press fit. Consequently, this process can reduce the number of steps to achieve balance as it results in low residual unbalance of SWA and BB subassembly of a turbocharger without a need to separately balance the SWA.

With respect to manufacturing, a balanced SWA/BB subassembly can increase center housing rotating assembly (CHRA) yield, provide a turbocharger population with lower unbalance levels, less scrap and ultimately, quieter turbochargers. As described herein, reduction of SWA/BB subassembly unbalance on a CHRA is achieved by balancing the SWA/BB subassembly after press fitting the SWA shaft into the BB.

An exemplary process utilizes a low speed, belt drive to rotate a SWA/BB subassembly. In this process, the belt drive, while driving the SWA to measurement speeds, simultaneously loads the ball bearings in their raceways and maintains a consistent transmission of force/velocity to transducers of a balancing unit. Upon successful reduction of SWA/BB subassembly unbalance, any further balance process (e.g., CHRA balance process) will have a higher yield as the major components of the rotating group are now balanced.

Figure 5:
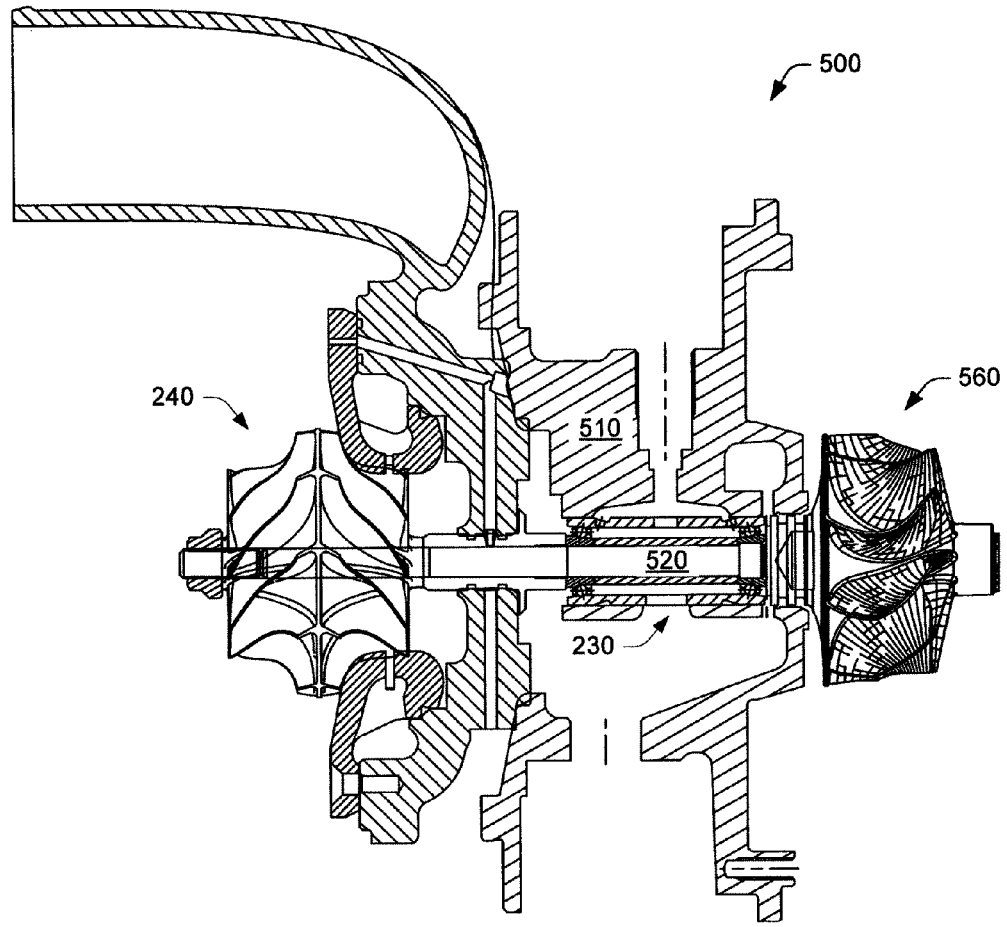
FIG. 5 is a cross-sectional view of an exemplary turbocharger CHRA that allows for insertion of a SWA/BB subassembly via a turbine end of a center housing.

FIG. 5 shows an exemplary assembly 500 that allows for insertion of a bearing cartridge 230 from a turbine end of a center housing 510. As mentioned, in the assembly 200 of FIGS. 2 and 3 the bearing cartridge 230 must be inserted from the compressor end of the housing 210 while the shaft 220 must be inserted from the turbine end of the housing 210. Consequently, the bearing cartridge 230 and the shaft 220 cannot be assembled and balanced and then inserted together as a unit into the housing 210. In contrast, in the assembly 500, the center housing 510 includes an enlarged turbine side opening that allows insertion of a SWA/BB (i.e., the bearing cartridge 230 and a shaft 520) into the through bore of the center housing 510. Accordingly, a SWA/BB subassembly can be balanced and then inserted directly into a center housing without removal of the SWA from the BB.

As a ball bearing cartridge can shift the geometric centerline of a rotor group, an exemplary component balance process rotates the rotor about the centerline created by the ball bearing cartridge. Further, once a SWA is press fit into a BB, optimally, this subassembly should not be disassembled after balancing. The conventional housing 210 of FIGS. 2 and 3 requires disassembly of the SWA/BB after balancing whereas the housing 510 of FIG. 5 does not require disassembly of the SWA/BB after balancing.

Figure 6:
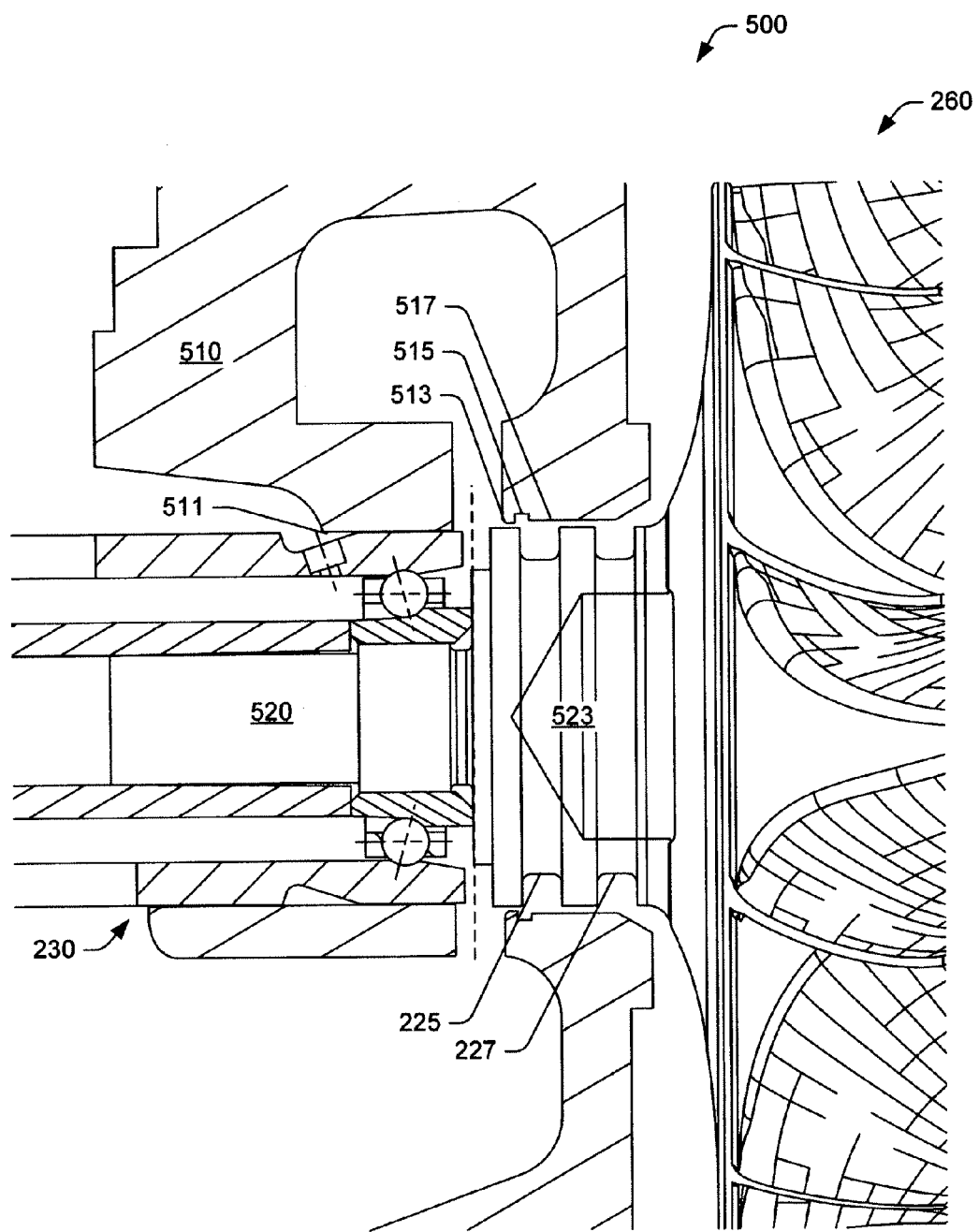
FIG. 6 is a cross-sectional view of a portion of the center housing of FIG. 5 to illustrate turbine end features that allow for insertion of the SWA/BB subassembly.

FIG. 6 shows a cross-sectional view of the assembly 500 that focuses on the turbine end. The housing 510 includes a through bore 511 having a diameter to accommodate the bearing cartridge 230. In addition, the housing 510 includes a turbine end opening 513 having an enlarged diameter to allow for passage of the bearing cartridge 230 into the through bore 511.

Adjacent the opening 513, the housing 510 includes a step and channel feature 515 and a bore 517 having a diameter equal to or greater than the diameter of the through bore 511. These step bore features help to seal the bearing cartridge space from hot exhaust gases of the turbine. Specifically, a turbine end portion 523 of the shaft 520 includes one or more grooves 225, 227 to seat seal rings (not shown in FIG. 6). Positioning of seal rings in the grooves 225, 227 seals the hot exhaust gasses of the turbine from the center-housing and its lubricant. Where the lubricant includes a lubricant connection to the engine crankcase, such a seal mechanism also reduces contamination of engine lubricant. Hence, the seal mechanism functions to prevent oil from leaking into the turbine housing as well as preventing exhaust leakage into the centerhousing and engine crankcase, commonly referred to as "blow-by".

In the assembly 200 of FIGS. 2 and 3, the diameter of the turbine portion 223 is smaller than the diameter of the bearing cartridge 230, however, in the assembly 500 of FIGS. 5 and 6, the diameter of the turbine portion 523 is enlarged (e.g., approximately the same as the diameter of the bearing cartridge). Such an enlarged diameter can increase risk of blowby as it can increase exhaust flow area at the turbine end.

To reduce blow-by, the seal mechanism of the assembly 500 provides a buffer space along the bore 517 where the buffer space is located between two seal rings. This buffer space acts to reduce the pressure differential across each ring and thereby reduces flow of exhaust past the turbine end seal. While two rings are shown in FIG. 6, more than two rings may be used to form a seal between the exhaust space and the lubricant space of the center housing.

Figure 7:
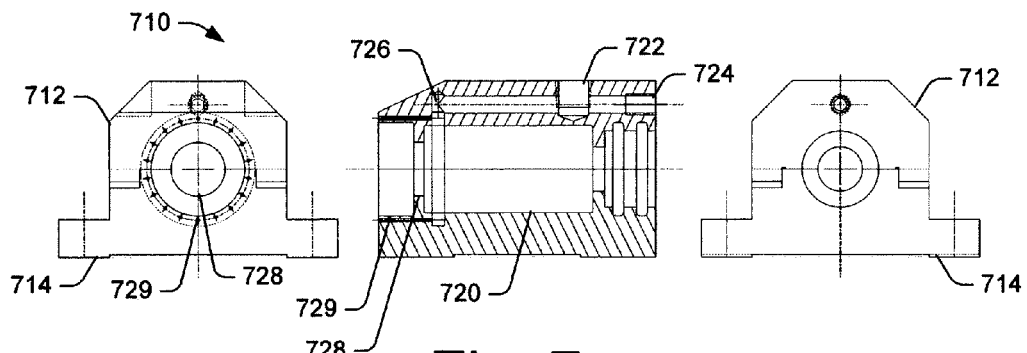
FIG. 7 is two end views and a cross-sectional view of an exemplary clamp to clamp a bearing cartridge.
Figure 8:
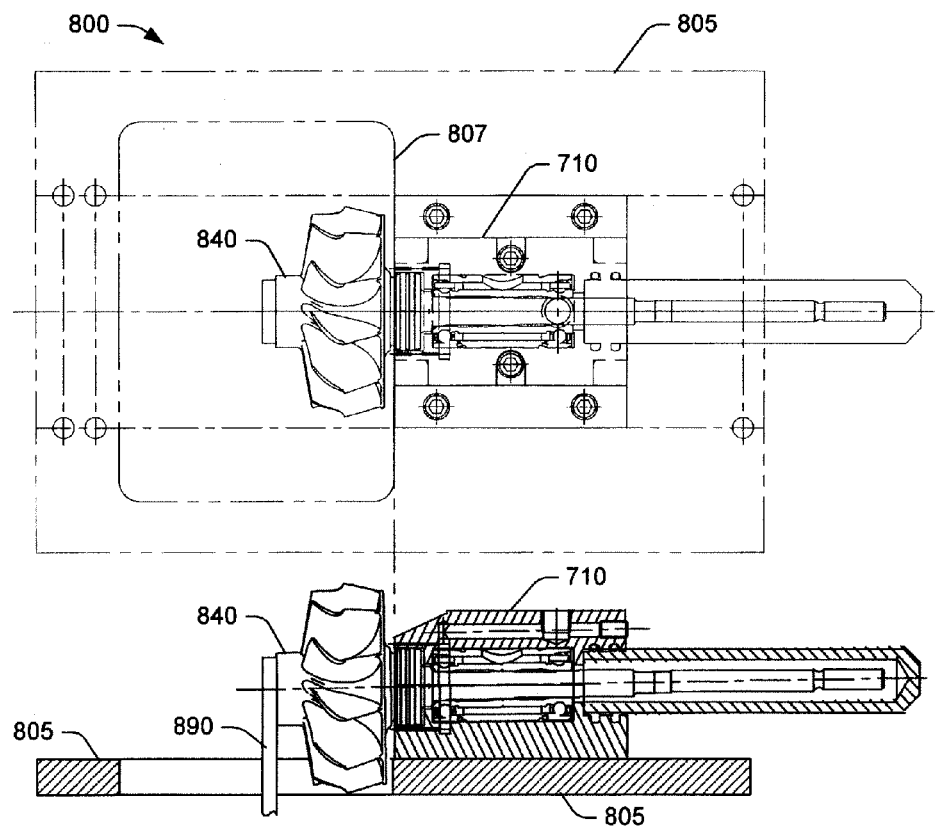
FIG. 8 is a top view and a cross-sectional view of a balancing assembly.

FIGS. 7 and 8 show exemplary balancing components for SWA/BB balancing. FIG. 7 shows three views of an exemplary clamp 710 that includes various features of the clamp 410 of FIG. 4. The clamp 710 includes an upper portion 712 and a lower portion 714 that act as a clamshell to clamp a bearing cartridge in a bore 720.

The clamp 710 includes a reduced bore diameter 728 adjacent an opening 729 where the reduced diameter 728 acts to prevent material from entering the bore 720 as well as to retain fluid in the bore 720. Fluid openings 722, 724 and 726 allow for fluid to cool and/or lubricate a bearing cartridge positioned in the bore 720.

FIG. 8 shows a top view and a cross-sectional view of an assembly 800 that includes a mounting plate 805 to which the clamp 710 is mounted. In the example of FIG. 8, a SWA 840 is clamped by the clamp 710 and thereby secured to the mounting plate 805. The mounting plate 805 includes an opening 807 that allows a belt 890 to be positioned over part of the SWA 840 to rotate the SWA 840. While the belt 890 is shown as being positioned over a particular end portion of the SWA 840, other arrangements are possible (e.g., over the blade portion, etc.).

As described herein, an exemplary clamp for clamping a bearing cartridge and shaft subassembly of a turbocharger includes an upper portion, a lower portion where the upper portion and the lower portion form a bore having a bore diameter sized to clamp a bearing cartridge and a fluid passage defined in part by the upper portion, the lower portion or both the upper portion and the lower portion where the fluid passage includes an opening to the bore. Such a clamp optionally includes an extension with a bore to receive part of a shaft, the shaft rotatably supported by the bearing cartridge. This extension can cover a compressor portion of the shaft and can prevent intrusion of debris and prevent material from contacting a rotating compressor portion of the shaft.

An exemplary method for balancing a subassembly of a turbocharger includes press fitting a shaft into a bearing cartridge where the shaft includes a turbine wheel to form a bearing cartridge and shaft subassembly, clamping the subassembly in a bore of a clamp to secure an outer race of the bearing cartridge, rotating the shaft, measuring unbalance in one or more planes, pressurizing the bore and balancing the subassembly. In such a method, the pressurizing prevents material from entering the bore. For example, during balancing, the use of pressure (e.g., air pressure) can help prevent material being removed from the turbine wheel from entering the bore. Pressure may be used prior to measuring unbalance or used after measuring unbalance and during balancing.

As described herein, an exemplary method can measure unbalance and/or balance a subassembly and then place the subassembly into a center housing of a turbocharger without disassembling the subassembly.

Various techniques can rotate a subassembly by applying a force to a turbine wheel where the applied force reduces axial movement of the shaft in the bearing cartridge. Such force can alternatively or additionally reduce radial movement of the shaft in the bearing cartridge. As described with respect to FIG. 8, a method can include placing a belt over a portion of a turbine wheel to rotate the wheel and to apply a force to a subassembly.

Measurement and balancing processes may occur in an automated manner. For example, a machine may measure unbalance of a subassembly, generate instructions to remove material from subassembly and then carry out the instructions (e.g., using a cutting tool, a lathe, etc.).

Measurement and balancing processes may occur at separate work stations or at the same work station. For example, throughput may be higher for measuring unbalance of units as some units may be within a suitable error or tolerance. Hence, measurement may occur at one work station and balancing at another work station. In such an arrangement, the balancing work station may also include features to measure unbalance (e.g., after removal of some material from a subassembly).

As described herein, an exemplary center housing for a turbocharger includes a compressor end and a turbine end and a through bore that includes a turbine end opening for receiving a bearing cartridge and shaft subassembly. In an assembly, the subassembly can include a turbine end shaft portion having an outer diameter approximately equal to or greater than an outer diameter of the bearing cartridge. A turbine end shaft portion can include grooves where each groove is configured to seat a seal ring (e.g., to seal the center housing bore from exhaust). A seal mechanism can include a step bore and a buffer space located between two seal rings. A subassembly inserted into the center housing can be balanced as a unit and inserted into the through bore without disassembly.

An exemplary center housing rotating assembly (CHRA) for a turbocharger includes a bearing cartridge and shaft subassembly balanced as a unit and a center housing that includes a compressor end and a turbine end and a through bore that includes a turbine end opening for receiving the bearing cartridge and shaft subassembly. In such a CHRA, the subassembly can include a turbine end shaft portion having an outer diameter approximately equal to or greater than an outer diameter of the bearing cartridge.

Although some exemplary methods, devices, systems, arrangements, etc., have been illustrated in the accompanying Drawings and described in the foregoing Detailed Description, it will be understood that the exemplary embodiments disclosed are not limiting, but are capable of numerous rearrangements, modifications and substitutions without departing from the spirit set forth and defined by the following claims.

What is claimed is:

1. A method for providing a turbocharger subassembly as a balanced unit, the method comprising:
    press fitting a shaft into a bearing cartridge wherein the shaft comprises a turbine wheel to form a bearing cartridge and shaft subassembly;
    clamping the subassembly in a bore of a clamp to secure an outer race of the bearing cartridge;
    rotating the shaft of the subassembly with the outer race secured by the clamp;
    measuring unbalance of the subassembly in one or more planes;
    with the outer race secured by the clamp, pressurizing the bore of the clamp with air to prevent material from entering the bore; and
    balancing the subassembly by removing material from the turbine wheel in response to the measuring unbalance to provide the subassembly as a balanced unit configured for insertion into a bore of a turbocharger housing without disassembly of the balanced unit.

2. The method of claim 1 wherein the material comprises material removed from the turbine wheel in response to measuring unbalance of the subassembly.

3. The method of claim 1 further comprising placing the balanced unit into a bore of a center housing of a turbocharger without disassembling the balanced unit.

4. The method of claim 1 wherein the rotating comprises applying a force to the turbine wheel.

5. The method of claim 4 wherein the applied force reduces axial movement of the shaft in the bearing cartridge.

6. The method of claim 4 wherein the applied force reduces radial movement of the shaft in the bearing cartridge.

7. The method of claim 1 wherein the rotating comprises placing a belt over a portion of the turbine wheel.

8. The method of claim 7 wherein the belt applies the force.

9. The method of claim 1 wherein the measuring unbalance and the balancing occur at separate work stations.

10. The method of claim 1 wherein the measuring unbalance and the balancing occur at the same work station.

11. The method of claim 1 wherein the measuring unbalance and the balancing comprise automated processes.

12. The method of claim 1 wherein the pressurizing occurs prior to the measuring unbalance.

* * * * *